United States Patent
Balasubramanian et al.

(10) Patent No.: US 11,853,745 B2
(45) Date of Patent: Dec. 26, 2023

(54) METHODS AND SYSTEMS FOR AUTOMATED OPEN SOURCE SOFTWARE REUSE SCORING

(71) Applicant: Open Weaver Inc., Miami, FL (US)

(72) Inventors: Ashok Balasubramanian, Chennai (IN); Karthikeyan Krishnaswamy Raja, Chennai (IN); Meenakshisundaram Chinnappan, Chennai (IN); Lakshmipathy Ganesh Eswaran, Chennai (IN)

(73) Assignee: Open Weaver Inc., Miami, FL (US)

(*) Notice: Subject to any disclaimer, the term of this patent is extended or adjusted under 35 U.S.C. 154(b) by 0 days.

(21) Appl. No.: 17/676,987

(22) Filed: Feb. 22, 2022

(65) Prior Publication Data

US 2022/0276860 A1    Sep. 1, 2022

Related U.S. Application Data

(60) Provisional application No. 63/154,354, filed on Feb. 26, 2021.

(51) Int. Cl.
*G06F 8/70* (2018.01)
*G06F 8/36* (2018.01)

(52) U.S. Cl.
CPC . *G06F 8/70* (2013.01); *G06F 8/36* (2013.01)

(58) Field of Classification Search
CPC .................................. G06F 8/30; G06F 8/36
(Continued)

(56) References Cited

U.S. PATENT DOCUMENTS 5,953,526 A    9/1999 Day et al.
7,322,024 B2 * 1/2008 Carlson ................ G06F 8/36
                                                 707/999.103
(Continued)

FOREIGN PATENT DOCUMENTS

CN        108052442 A     5/2018
KR   10-2020-0062917      6/2020
(Continued)

OTHER PUBLICATIONS

Stanciulescu et al, "Forked and Integrated Variants in an Open-Source Firmware Project", IEEE, pp. 151-160 (Year: 2015).*
(Continued)

*Primary Examiner* — Anil Khatri
(74) *Attorney, Agent, or Firm* — Foley & Lardner LLP

(57) ABSTRACT

Methods and systems for automated scoring of open-source libraries on their state of reuse in software projects are provided. A system is configured to extract information about the software project, determine whether the extracted information includes information regarding any forked projects, calculate a useful fork reuse score for a forked project, calculate a reuse score in the forked project based on source code attributes including a source code class, create a tree structure for the source code class, identify functions from the tree structure of the source code class, identify similar code sections from the two source code files, calculate a code attributes reuse score based on the similar code sections, calculate a dependent consumption reuse score which indicates how much a function is reused by a dependent class, and calculate a unified reuse score based on the reuse score of the forked project and the dependent consumption reuse score.

18 Claims, 8 Drawing Sheets

(58) Field of Classification Search
USPC .................................................. 717/101–140
See application file for complete search history.

(56) References Cited

U.S. PATENT DOCUMENTS

| | | | |
|---|---|---|---|
| 7,703,070 B2* | 4/2010 | Bisceglia | G06F 11/3664 |
| | | | 717/101 |
| 7,774,288 B2 | 8/2010 | Acharya et al. | |
| 7,958,493 B2 | 6/2011 | Lindsey et al. | |
| 8,010,539 B2 | 8/2011 | Blair-Goldensohn et al. | |
| 8,051,332 B2* | 11/2011 | Zakonov | G06F 11/3409 |
| | | | 714/38.1 |
| 8,112,738 B2* | 2/2012 | Pohl | G06F 40/143 |
| | | | 717/121 |
| 8,112,744 B2 | 2/2012 | Geisinger | |
| 8,219,557 B2 | 7/2012 | Grefenstette et al. | |
| 8,296,311 B2 | 10/2012 | Rapp et al. | |
| 8,412,813 B2* | 4/2013 | Carlson | G06F 8/36 |
| | | | 709/224 |
| 8,417,713 B1 | 4/2013 | Blair-Goldensohn et al. | |
| 8,452,742 B2 | 5/2013 | Hashimoto et al. | |
| 8,463,595 B1 | 6/2013 | Rehling et al. | |
| 8,498,974 B1 | 7/2013 | Kim et al. | |
| 8,627,270 B2 | 1/2014 | Fox et al. | |
| 8,677,320 B2* | 3/2014 | Wilson | G06F 11/3688 |
| | | | 717/124 |
| 8,688,676 B2 | 4/2014 | Rush et al. | |
| 8,838,606 B1 | 9/2014 | Cormack et al. | |
| 8,838,633 B2 | 9/2014 | Dhillon et al. | |
| 8,935,192 B1 | 1/2015 | Ventilla et al. | |
| 8,943,039 B1 | 1/2015 | Grieselhuber et al. | |
| 9,015,730 B1 | 4/2015 | Allen et al. | |
| 9,043,753 B2 | 5/2015 | Fox et al. | |
| 9,047,283 B1 | 6/2015 | Zhang et al. | |
| 9,135,665 B2 | 9/2015 | England et al. | |
| 9,176,729 B2 | 11/2015 | Mockus et al. | |
| 9,201,931 B2 | 12/2015 | Lightner et al. | |
| 9,268,805 B2* | 2/2016 | Crossley | G06F 8/36 |
| 9,330,174 B1 | 5/2016 | Zhang | |
| 9,361,294 B2 | 6/2016 | Smith | |
| 9,390,268 B1* | 7/2016 | Martini | H04L 63/1416 |
| 9,471,559 B2 | 10/2016 | Castelli et al. | |
| 9,589,250 B2* | 3/2017 | Palanisamy | G06Q 10/06 |
| 9,626,164 B1* | 4/2017 | Fuchs | G06F 11/3664 |
| 9,672,554 B2 | 6/2017 | Dumon et al. | |
| 9,977,656 B1 | 5/2018 | Mannopantar et al. | |
| 10,484,429 B1 | 11/2019 | Fawcett et al. | |
| 10,761,839 B1 | 9/2020 | Migoya et al. | |
| 10,922,740 B2 | 2/2021 | Gupta et al. | |
| 11,474,817 B2* | 10/2022 | Sousa | G06F 8/36 |
| 2001/0054054 A1 | 12/2001 | Olson | |
| 2002/0059204 A1 | 5/2002 | Harris | |
| 2002/0150966 A1 | 10/2002 | Muraca | |
| 2002/0194578 A1 | 12/2002 | Irie et al. | |
| 2004/0243568 A1 | 12/2004 | Wang et al. | |
| 2006/0090077 A1 | 4/2006 | Little et al. | |
| 2006/0200741 A1 | 9/2006 | Demesa et al. | |
| 2006/0265232 A1 | 11/2006 | Katariya et al. | |
| 2007/0050343 A1 | 3/2007 | Siddaramappa et al. | |
| 2007/0185860 A1 | 8/2007 | Lissack | |
| 2007/0234291 A1 | 10/2007 | Ronen et al. | |
| 2007/0299825 A1 | 12/2007 | Rush et al. | |
| 2009/0043612 A1 | 2/2009 | Szela et al. | |
| 2009/0319342 A1 | 12/2009 | Shilman et al. | |
| 2010/0106705 A1 | 4/2010 | Rush et al. | |
| 2010/0121857 A1 | 5/2010 | Elmore et al. | |
| 2010/0174670 A1 | 7/2010 | Malik et al. | |
| 2010/0205198 A1 | 8/2010 | Mishne et al. | |
| 2010/0205663 A1 | 8/2010 | Ward et al. | |
| 2010/0262454 A1 | 10/2010 | Sommer et al. | |
| 2011/0231817 A1 | 9/2011 | Hadar et al. | |
| 2012/0143879 A1 | 6/2012 | Stoitsev | |
| 2012/0259882 A1 | 10/2012 | Thakur et al. | |
| 2012/0278064 A1 | 11/2012 | Leary et al. | |
| 2013/0103662 A1 | 4/2013 | Epstein | |
| 2013/0117254 A1 | 5/2013 | Manuel-Devadoss et al. | |
| 2014/0040238 A1 | 2/2014 | Scott et al. | |
| 2014/0075414 A1 | 3/2014 | Fox et al. | |
| 2014/0163959 A1 | 6/2014 | Hebert et al. | |
| 2014/0188746 A1 | 7/2014 | Li | |
| 2014/0297476 A1 | 10/2014 | Wang et al. | |
| 2014/0337355 A1 | 11/2014 | Heinze | |
| 2015/0127567 A1 | 5/2015 | Menon et al. | |
| 2015/0220608 A1 | 8/2015 | Crestani Campos et al. | |
| 2015/0331866 A1 | 11/2015 | Shen et al. | |
| 2016/0253688 A1 | 9/2016 | Nielsen et al. | |
| 2016/0350105 A1 | 12/2016 | Kumar et al. | |
| 2016/0378618 A1 | 12/2016 | Cmielowski et al. | |
| 2017/0034023 A1 | 2/2017 | Nickolov et al. | |
| 2017/0220633 A1 | 8/2017 | Porath et al. | |
| 2017/0286541 A1 | 10/2017 | Mosley et al. | |
| 2018/0046609 A1 | 2/2018 | Agarwal et al. | |
| 2018/0067836 A1 | 3/2018 | Apkon et al. | |
| 2018/0114000 A1 | 4/2018 | Taylor | |
| 2018/0329883 A1 | 11/2018 | Leidner et al. | |
| 2019/0278933 A1 | 9/2019 | Bendory et al. | |
| 2019/0311044 A1 | 10/2019 | Xu et al. | |
| 2019/0324981 A1 | 10/2019 | Counts et al. | |
| 2020/0110839 A1 | 4/2020 | Wang et al. | |
| 2020/0125482 A1 | 4/2020 | Smith et al. | |
| 2020/0133830 A1 | 4/2020 | Sharma et al. | |
| 2020/0293354 A1 | 9/2020 | Song et al. | |
| 2020/0348929 A1 | 11/2020 | Sousa et al. | |
| 2021/0141863 A1 | 5/2021 | Wu et al. | |
| 2021/0149668 A1 | 5/2021 | Gupta et al. | |
| 2021/0349801 A1 | 11/2021 | Rafey | |
| 2021/0357210 A1 | 11/2021 | Clement et al. | |
| 2022/0012297 A1 | 1/2022 | Basu et al. | |

FOREIGN PATENT DOCUMENTS

| WO | WO-2007/013418 A1 | 2/2007 |
|---|---|---|
| WO | WO-2020/086773 A1 | 4/2020 |

OTHER PUBLICATIONS

Schweik et al, Proceedings of the OSS 2011 Doctoral Consortium, Oct. 5, 2011, Salvador, Brazil, pp. 1-100, http://works.bepress.com/charles_schweik/20 (Year: 2011).*

Zaimi et al, ":An Empirical Study on the Reuse of Third-Party Libraries in Open-Source Software Development", ACM, pp. 1-8 (Year: 2015).*

Lampropoulos et al, " REACT—A Process for Improving Open-Source Software Reuse", IEEE, pp. 251-254 (Year: 2018).*

Rothenberger et al, "Strategies for Software Reuse: A Principal Component Analysis of Reuse Practices", IEEE, pp. 825-837 (Year: 2003).*

Tung et al, "A Framework of Code Reuse in Open Source Software", ACM, pp. 1-6 (Year: 2014).*

Lotter et al, "Code Reuse in Stack Overflow and Popular Open Source Java Projects", IEEE, pp. 141-150 (Year: 2018).*

Khatri et al, "Validation of Patient Headache Care Education System (PHCES) Using a Software Reuse Reference Model", Journal of System Architecture, pp. 157-162 (Year: 2001).*

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Iderli Souza, An Analysis of Automated Code Inspection Tools for PHP Available on Github Marketplace, Sep. 2021, pp. 10-17 (Year: 2021).

* cited by examiner

METHODS AND SYSTEMS FOR AUTOMATED OPEN SOURCE SOFTWARE REUSE SCORING

CROSS-REFERENCE TO RELATED PATENT APPLICATION

This application claims the benefit of and priority to U.S. Provisional Patent Application No. 63/154,354 filed Feb. 26, 2021, the entire disclosure of which is incorporated by reference herein.

TECHNICAL FIELD

The present disclosure relates to methods and systems for automated scoring of the open-source libraries on their state of reuse in software projects.

BACKGROUND

There are over 40 million open-source software components available in the public domain today. A critical problem in the practice of software reuse is the lack of a dependable process model which provides the necessary details to support reuse-based software development and evolution. Ad hoc development of reuse practices has led to potential benefits of reuse not being fully realized. It is further difficult to determine under a given context which artifacts are best suited to solve a particular problem and ease of reusing them. There is also a lack of systems which can measure the reusability of software and structuring of metrics suitable to the problem on hand.

U.S. Pat. No. 8,688,676, titled "Source Code Search Engine" by Darren Rush, and Ankur Bulsara, filed on Oct. 20, 2009, and granted on Apr. 1, 2014, discloses a system, method and apparatus for a source code search engine. This document describes providing a single search interface to multiple source code repositories or storage systems. The search interface may search source code on a variety of levels of detail. The said search interface may further rank the source code based on usage and reuse. This document deals mainly with search, search listing and indexing. Further, the reuse score mentioned in this document is calculated with the aspect of search, and this score is then used for ranking of the search results. However, this document is silent regarding calculating a reuse score for open-source libraries.

U.S. Pat. No. 9,176,729, titled "System and Method for Prioritizing and Remediating Defect Risk in Source Code" by Audris Mockus, Randy L. Hackbarth, and John D. Palframan, filed on Oct. 4, 2013, and granted on Nov. 3, 2015, discloses systems, methods, and computer-readable storage media for identifying and remediating risky source files. The disclosed system may gather data describing each file or collection of files, such as a module, in a source code repository, and analyze files to determine equivalence classes of files based on the most similar. For such files, the system can generate a collective risk score for each equivalence class. That is, this document proposes risk scores to mitigate defective code. However, this document also suggests nothing related to a score that can assess the reusability of open-source libraries.

However, the documents and the conventional techniques existed at the time of this disclosure does not teach or suggest any techniques for measuring the open-source library reuse. In detail, the traditional quality measurement systems use the inherent reuse related code quality metrics of the software without considering the real-world usage of the libraries which will provide the true functional reuse potential of the software library.

Therefore, to overcome the above mentioned disadvantages as well as for improving the existing technology, there is a need for an improved method of measuring software libraries reuse.

SUMMARY

The following presents a simplified summary in order to provide a basic understanding of some aspects of this disclosure. This summary is not an extensive over view, and it is not intended to identify key/critical elements or to delineate the scope thereof. Its sole purpose is to present some concepts in a simplified form as a prelude to the more detailed description that is presented later. The subject matter should be understood by reference to appropriate portions of the entire specification of this patent, any or all drawings, and each claim.

Measuring the open-source library reuse based on forking and dependency consumption is an alternative solution to the problem of open-source library reuse since it creates a measurable dimension using which we can measure software reuse in a proven way. The systems and methods described herein provide an improved method, system, and computer readable storage media for measuring software libraries reuse. The disclosed method provides a systemic way of measuring the useful forks and dependency consumption which provide a unique dimension for the reusability of open-source repositories.

It is a widespread practice by developers to create forks on open-source projects when they want to build additional functionality on an existing open-source project. The forked project's source code is a modified version of the parent project's source code, to produce a different product (i.e. the forked version).

The system calculates a forked project reuse index in different dimensions of useful forks, code reuse and functional reuse index.

The system collects the data of the forked project's source code commit history records. The system retrieves each commit history record with the date and timestamp, the number of files affected by this commit. The number of commits done during a defined interval of time is calculated to arrive at a source code commit activity score. This score determines if the fork is active or not. If there are regular commits happening to the forked repository it is a useful fork. The system will ignore the other forks where there are no activity happening or activity is less than the system configured threshold limit.

The other aspect with the commit history data, is to compare the parent project's source code commit history rate and the forked project's commit history rate. These different rates are compared by the system to give a weighted score based on increased or decreased rate of commits. Commit history rate is the average number of commits done for a source code on an active project over a period. Period can be number of days, weeks, months, or years. Commit history rate is applicable for parent project and forked projects.

The system combines the above said two scores, e.g., the source code commit activity score and the weighted score based on increased or decreased rate of commits, to arrive at the final score for the forked projects by comparing their scores against a set threshold baseline score. These scores are used by the system for calculating the forked project's reuse index contribution from the useful fork dimension, e.g., useful fork reuse index.

The source code of the forked project and the parent project is compared by the System on different attributes such as LOC (Lines of Code), number of classes or files, number of variables within each class or file and same line of code. For each forked project, the system will calculate the net source code reuse done by the fork using the values from the comparison on above mentioned attributes. Each attribute comparison provides information on the number of net additions done on the fork e.g., at a class level comparison, system will calculate total number of classes which are with same name as in parent and number of classes which are newly added. Similarly, within each class with same name, it will compare each line of statement code and calculate the number of lines which are same and the number of lines which are different or new additions. The comparison is made on other attributes such as the number of class level variables and functions too. This will be used by the system to calculate source code attributes reuse index.

The system calculates method level reuse index by employing natural language processing techniques and logic based comparison. Instead of doing a direct line comparison, the comparison is made at method level and similar methods between the parent and forked project are identified. This technique will take care of situations where the forked project's method's internal source code has been slightly modified from the parent project's version e.g., the names of the variables may have been changed slightly, the number of variable arguments to the method may have changed slightly. The lines of code within the method can be different but they might be doing the same operations as in parent method. The system will still detect these and mark them as similar which will correctly attribute these as reused from the parent method. This way the system calculates the method reuse index which contributes to the overall reuse index score from the forked projects (i.e. the forked project reuse index).

The dependent consumption provides another dimension of the reuse of the library. This measurement considers the other libraries which are directly dependent on the parent library for their operations by importing them into their runtime environment. Typically, other measurements only consider the number of dependent libraries, but the system calculates this index not only on the number of dependent libraries but their actual functional usage of the parent library e.g., one child library using ten functions from the parent and another child could be using fifteen functions from the parent. The system calculates the number of functions used by each dependent library and aggregates it across all the dependents. The system determines this quantified measure of function usage for calculating a dependent consumption reuse index.

The foregoing, together with other features and embodiments, will become more apparent upon referring to the following specification, claims, and accompanying drawings.

One aspect includes a system for automatically scoring open-source libraries on a state of reuse in a software project, the system comprising: one or more processors and memory storing instructions that, when executed by the one or more processors, cause the one or more processors to perform operations comprising: extracting information about the software project from a source code repository; determining whether the extracted information includes information regarding any forked projects; calculating, upon determining that a forked project is included, a useful fork reuse score for the forked project based on source code attributes including a source code class; creating a tree structure for the source code class; identifying functions from the tree structure of the source code class; identifying similar code sections from the two source code files; calculating a code attributes reuse score based on the similar code sections; calculating a dependent consumption reuse score which indicates how much a function is reused by a dependent class; and calculating a unified reuse score based on the reuse score of the forked project and the dependent consumption reuse score for the analyzed project.

In some embodiments, the operations further include, via a web portal, a web form for accepting project details including one or more of user name, repository details, remote location URL of the project, or user email details for sending notifications.

In some embodiments, the operations further include reading the key project information from the source code repositories including one or more of programming language of the project, location of the build file, latest release version of the project, commit histories, or forks details.

In some embodiments, the operations further include: fetching source code commit history of the project and its forks; validating the forks for its usefulness based on the commit history trends of the fork and parent project; and calculating the useful fork reuse score.

In some embodiments, the calculating the unified score includes applying different weights to the individual scores based on rules on how to apply the weights.

In some embodiments, the operations further include connecting to the source code repository; and downloading the source code for the software project and the forked project; and saving the source code for both the software project and the forked project to the file storage.

In some embodiments, the operations further include finding, using natural language processing techniques and logical comparisons, similarity of functions between the software project and the forked project in the code based on function names and variable names used in the functions; and detecting variations in the function names or the variable names including one or more of a prefix, a suffix, similar sounding names, changes in similar operations in the code, or order of lines in functions apart from other variations.

In some embodiments, the operations further include tokenizing a plurality of lines of code from the software project and the forked project; comparing the tokens of the plurality of lines of code; calculating efficient time saved by reusing the parent source code; and comparing the lines of code, variables, functions, and reused for calculating the reuse score.

In some embodiments, the operations further include scanning a generated tree structure for the source code file; and identifying the functions and signatures of the source code file in the tree.

In some embodiments, the operations further include reading the source files using a programming language specific parser; and finding the matching lines of code between the source file in software project and the forked project.

In some embodiments, the operations further include scanning the entire source repository; and creating the data structure with details of the software project and the projects dependent on the software project.

Another aspect is a method for automatically scoring open-source libraries on a state of reuse in a software project, the method comprising: comparing source code commit activity of a forked project to the parent project including a number of changes being made to the source code within the specified duration, wherein the forked project includes a forked library; generating, based on the comparison, a useful fork reuse score; comparing source code of the useful forked projects with a parent source code of the software project to retrieve amount of code reuse; calculating, based on the comparison between the useful forked project source code and the parent source code, source code attributes reuse score of the forked library; comparing functions of the useful forked projects with the parent function code; calculating, based on the functions comparison, a function reuse score of the forked library; calculating, based on a number of functions from the parent library being consumed in the dependent libraries, a dependent consumption reuse score; and calculating a unified reuse score for the analyzed software project based on the useful fork reuse scores and dependent consumption reuse scores with rules-based weights.

In some embodiments, calculating the useful forks reuse score comprises: collecting data of commit history records associated with source code of forked open-source projects; retrieving each commit history record with the date and timestamp, and the number of files affected by each commit in the commit history record; determining a number of commits performed during a defined interval to generate a source code commit activity score, wherein whether the fork is active or not is dependent on the source code commit activity score; selecting useful forks by verifying whether regular commits are happening to a forked repository and ignoring other forks based on one of: no activity and activity being less than a threshold limit; comparing respective source code commit history rates of a parent project and the forked project to generate a weighted score based on increased or decreased rate of the commits; combining the respective source code commit history rates of a parent project and the forked project to generate a final score for the forked projects by further comparing their scores against a set threshold baseline score; and determining, via the scores, calculating a reuse score of the forked project.

In some embodiments, calculating the source code attributes reuse score comprises: retrieving the source code of useful fork projects; using programming language specific tokenizers to tokenize the source code constructs include one or more of variables, functions, or statements; extracting class members with details on the types of members data including one or more of variables, functions, or statements; comparing the fork source file attributes with their parent source file attributes; comparing the programming lines of code between the source file of the fork and the parent; comparing variables member definitions in the source file of the parent and the fork; and computing the code attributes reuse score by consolidating one or more of the details on the types of members data, the source file attributes, the programming lines of code, or the variable member definitions.

In some embodiments, calculating the function reuse score comprises: loading the same class or same name source file from the parent and fork project; creating a tree node structure; identifying functions from the forked class, by traversing the tree node structure; comparing the identified functions with each of the functions in the parent project's class; calculating a function reuse rate with number of matching function members between the forked function and the parent function; consolidating all the functions score per class; and calculating, at the project level, to the final function reuse score based on the consolidated functions scores.

In some embodiments, calculating the dependent consumption reuse score comprises: collecting metadata of repository including project related key information including location of a build file; parsing the build file; tracing dependencies for the project; building a tree list of projects and the dependencies; creating, based on the tree list of project and dependencies information, a reverse tree map with details of the parent project and the projects which are dependent on the project; loading source code of dependent projects; generating a call graph of all referenced functions being called from the dependent source file; identifying the references of components of the parent project; identifying the functions of the parent component being used by the dependent class; and computing dependent consumption reuse score based on the list of the identified functions reused.

In some embodiments, calculating the unified reuse score comprises: fetching rules for different weights for the individual reuse scores from reuse and dependent scores; and scaling the individual scores to a pre-defined scale.

Another aspect is a computer program product for automatically scoring open-source libraries on a state of reuse in a software project, the computer program product comprising a processor and memory storing instructions thereon, wherein the instructions when executed by the processor cause the processor to perform operations comprising: comparing source code commit activity of a forked project to the parent project including a number of changes being made to the source code within the specified duration, wherein the forked project includes a forked library; generating, based on the comparison, a useful fork reuse score; comparing source code of the useful forked projects with a parent source code of the software project to retrieve amount of code reuse; calculating, based on the comparison between the useful forked project source code and the parent source code, source code attributes reuse score of the forked library; comparing functions of the useful forked projects with the parent function code; calculating, based on the functions comparison, a function reuse score of the forked library; calculating, based on a number of functions from the parent library being consumed in the dependent libraries, a dependent consumption reuse score; and calculating a unified reuse score for the analyzed software project based on the useful fork reuse scores and dependent consumption reuse scores with rules-based weights.

In some embodiments, calculating the useful forks reuse score comprises: collecting data of commit history records associated with source code of forked open-source projects; retrieving each commit history record with the date and timestamp, and the number of files affected by each commit in the commit history record; determining a number of commits performed during a defined interval to generate a source code commit activity score, wherein whether the fork is active or not is dependent on the source code commit activity score; selecting useful forks by verifying whether regular commits are happening to a forked repository and ignoring other forks based on one of: no activity and activity being less than a threshold limit; comparing respective source code commit history rates of a parent project and the forked project to generate a weighted score based on increased or decreased rate of the commits; combining the respective source code commit history rates of a parent project and the forked project to generate a final score for the forked projects by further comparing their scores against a set threshold baseline score; and determining, via the scores, calculating a reuse score of the forked project.

In some embodiments, calculating the source code attributes reuse score comprises: retrieving the source code of useful fork projects; using programming language specific tokenizers to tokenize the source code constructs include one or more of variables, functions, or statements; extracting class members with details on the types of members data including one or more of variables, functions, or statements; comparing the fork source file attributes with their parent source file attributes; comparing the programming lines of code between the source file of the fork and the parent; comparing variables member definitions in the source file of the parent and the fork; and computing the code attributes reuse score by consolidating one or more of the details on the types of members data, the source file attributes, the programming lines of code, or the variable member definitions.

BRIEF DESCRIPTION OF THE DRAWINGS

Like reference numbers and designations in the various drawings indicate like elements.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the present disclosure. However, it will be apparent that various embodiments may be practiced without these specific details. The figures and description are not intended to be restrictive.

The ensuing description provides examples only, and is not intended to limit the scope, applicability, or configuration of the disclosure. Rather, the ensuing description of various examples will provide those skilled in the art with an enabling description for implementing any of the examples.

It should be understood that various changes may be made in the function and arrangement of elements without departing from the scope of the disclosure as set forth in the appended claims.

Furthermore, various examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Figure 1:
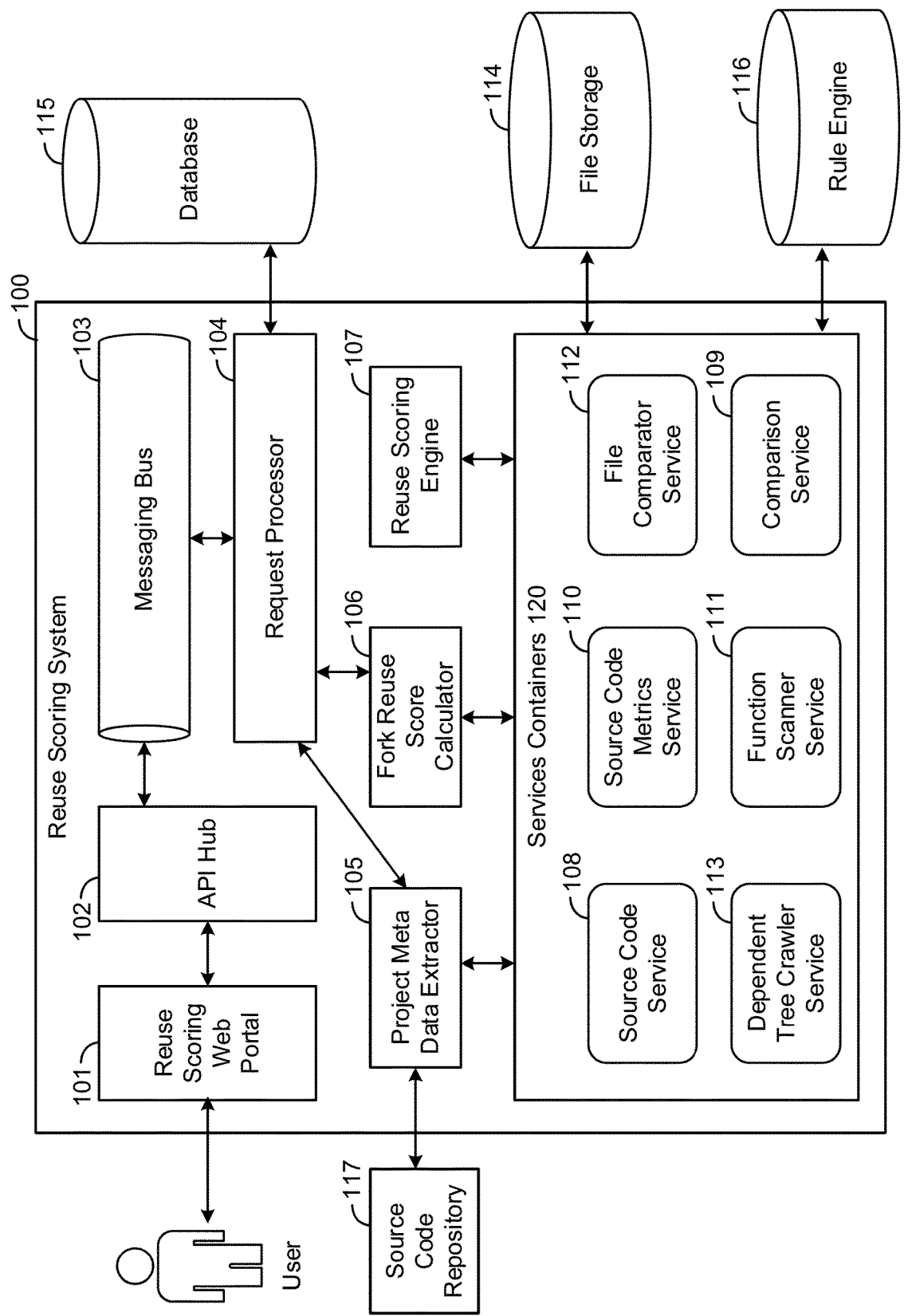
FIG. 1 shows a system architecture that performs automated reuse scoring for software projects, according to some embodiments.

FIG. 1 shows a system 100 or a high-level architecture that performs reuse scoring for software projects, in accordance with some embodiments. Briefly, and as described in further detail below, the automated reuse scoring system 100 is shown to include a Reuse Scoring Web Portal 101, API Hub 102, Messaging Bus 103, Request Processor 104, Project Meta Data Extractor 105, Fork Reuse Index Calculator 106, and Reuse Scoring Engine 107. The Service Containers 120 may include Source Code Service 108, Comparison Service 109, Source Code Metrics Service 110, Function Scanner Service 111, File Comparator Service 112, and Dependent Tree Crawler Service 113. The system 100 may include File Storage 114, Database 115 and Rule Engine 116 which are a unique set of components to perform the task of automatically scoring the reuse for the given software project.

In the embodiment shown in FIG. 1, the system 100 is shown to include the Reuse Scoring Web Portal 101 which has a User Interface form for a user to interface with the system 100 for submitting requests for knowing the reuse score of a given software project and viewing their status. The Reuse Scoring Web Portal 101 allows the user to submit requests to calculate the reuse score for one or more projects and viewing the generated results. The Reuse Scoring Web Portal 101 has a web form for the user to enter the project details such as project name, project depository details, notification email and a submit button to raise the request to perform the reuse analysis. Once submitted, the user can also view the status of the submitted request on the Reuse Scoring Web Portal 101. The system 100 sends an email notification when the request is completed processing. The user can access the results from the status screen.

The submitted request from Reuse Scoring Web Portal 101 goes to the API Hub 102 which acts as a gateway for accepting all web service requests from the Reuse Scoring Web Portal 101. The API Hub 102 hosts the web services for taking the requests and creating request messages to be put into the Messaging Bus 103. The Messaging Bus 103 provides for event driven architecture thereby enabling long running processes such as the reuse scoring to be decoupled from requesting system's calls. This decoupling will help the system 100 to service the request and notify user once the entire process of calculating the reuse score is completed. There are job listeners configured to listen to the messages in the Messaging Bus 103. Different type of messages triggers different jobs. The Request Processor 104 acts as a workflow system which sequences the different activities required from reading source code, processing source code to creating the reuse score across different dimensions mentioned above. The Request Processor 104 has the logic to sequence the tasks and address any exception scenarios while the tasks are processing the different steps for the request.

The Project Meta Data Extractor 105 reads the project information from the Source Code Repository 117, which can include GitHub or any other public repository and get detailed information of the project. This can also work within an organization's code repository. This information about the project could include the programming language of the project, location of the build file, latest release version of the project, etc.

The Fork Reuse Index Calculator 106 is a system component which calculates the useful fork reuse score and saves the result in the Database 115. The Fork Reuse Index Calculator 106 performs various operations to find the useful forks and calculate the reuse from the parent project.

The Reuse Scoring Engine 107 is the component which takes in the individual reuse scores calculated mentioned earlier and consolidated in this module to arrive at a unified reuse score for the analyzed project. The individual scores may be consolidated based on different rule settings such as different weightages (or weights) for the individual score categories. This can be then used to calculate the final normalized reuse score of the software project.

The Source Code Service 108 is a service component which is used to connect to the Source Code Repository 117 using the services provided to download the source code of the project for a particular release which is being analyzed.

The Comparison Service 109 is a service component which is used to compare function names, the variable names in the functions and find the similarity between them using different algorithms. These algorithms could be based on different mechanisms for calculating the similarity between them. One mechanism could be the Levenshtein distance between them or another could be based on semantically similar words with natural language processing techniques. Another algorithm can be based on fuzzy logic.

The Source Code Metrics Service 110 is a component which comprises of various tasks to calculate the reuse score from the source code attributes, e.g., the source code attributes reuse score. It uses the different utility functions to read source code, and compare the source files and other required actions on the source code attributes for calculating the metrics.

The Function Scanner Service 111 is a service component to identify the functions from the tree structure of a source code class which will be used for matching the forked project's method against the same or similar method from the parent class.

The File Comparator Service 112 component compares 2 source code files' text content and provide the similar sections. It is used for comparison functions as part of other components to detect reused source code from the parent project in the forks.

The Dependent Tree Crawler Service 113 is the component which scans the entire source repository and creates the data structure with details of a project and its dependent projects. This provides the dependent details to calculate reuse of the parent functions by the dependent projects. That is, Dependent Tree Crawler Service 113 calculates the dependent consumption reuse score.

The File Storage 114 is used to store document type of data like source code files by the system while processing the source code files for calculating the reuse score.

The Database 115 is a relational database (RDBS) database like MySQL to store all metadata pertaining to the requests received from the Reuse Scoring Web Portal 101, Messaging Bus 103, Request Processor 104 and from other system components described above. The metadata includes details of every request to identify the user who submitted it, requested project or source code details to track the progress as the system 100 processes the request through its different tasks. The status of each execution step in entire process is stored in this Database 115 to track and notify user on completion.

The Rule Engine 116 holds the different configurable rules like thresholds for similarity matching, usefulness, and other parameters in the system operations of the other components. An example of the rule would be the settings for finding the useful forks. As explained earlier, the rate of source code commits between the parent and the fork is compared. If the commit rate is more than, for example, 70% of the parent rate, it is a useful fork. This value of 70% is externalized into the Rule Engine 116 which can be set to appropriate values. The Rule Engine 116 may be implemented with the rules stored in JSON format in the database or file storage.

Figure 2:
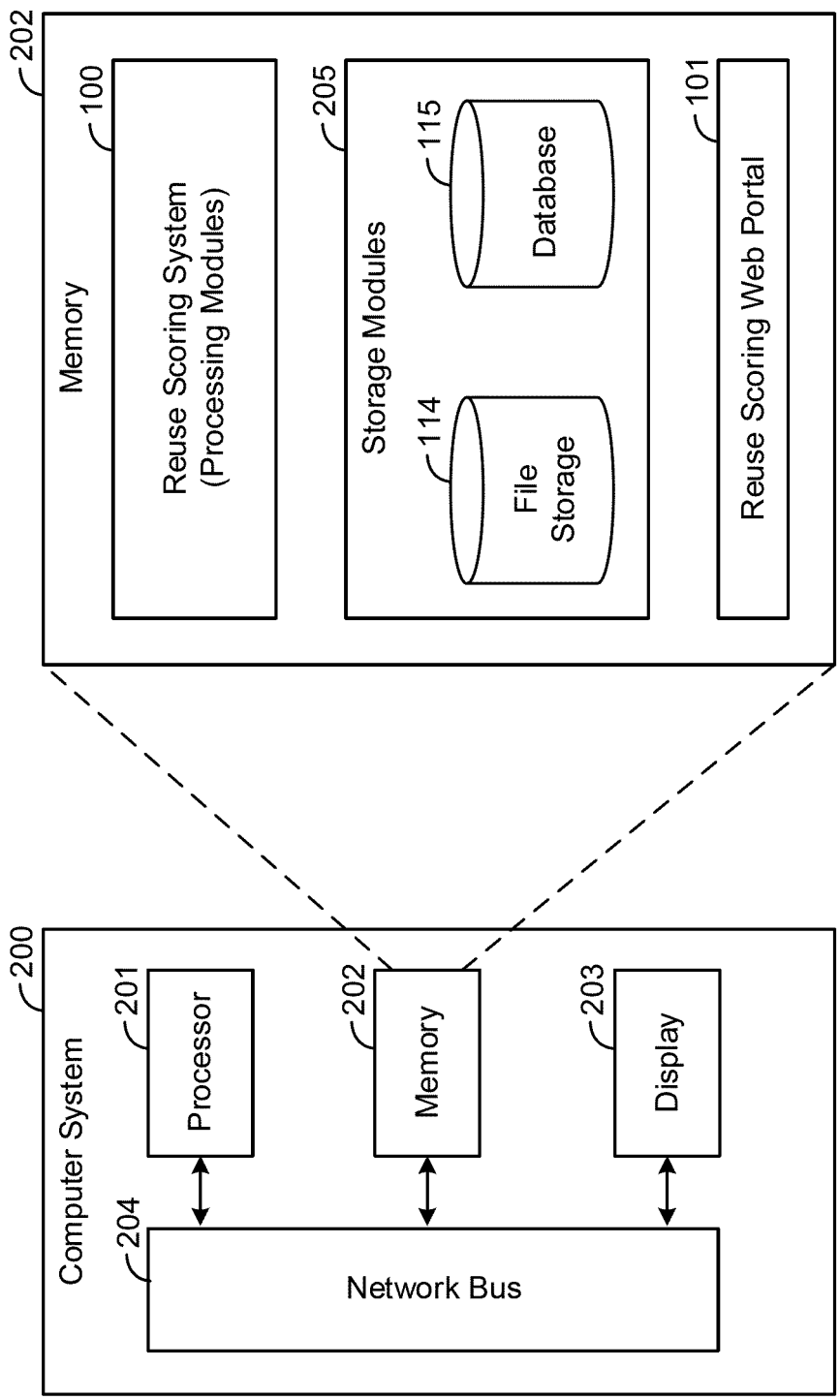
FIG. 2 shows an example computer system implementation for automated reuse scoring for software projects, according to some embodiments.

FIG. 2 shows a block view of a computer system 200 performing automated reuse scoring for software projects, in accordance with some embodiments. This may include a Processor 201, Memory 202, Display 203, Network Bus 204, and other input/output like a mic, speaker, wireless card etc. The processing modules of the automated Reuse Scoring System 100, File Storage 114, Database 115, Reuse Scoring Web Portal 101 are stored in the Memory 202 which provides the necessary machine instructions to the Processor 201 to perform the executions for creating the reuse score of software projects. In some embodiments, the Processor 201 controls the overall operation of the system and managing the communication between the components through the Network Bus 204. The Memory 202 holds the automated reuse scoring modules system code, data, and instructions for the processing modules of the automated Reuse Scoring System 100 and of diverse types of the non-volatile memory and volatile memory. In some embodiments, the Processor 201 and the Memory 202 form a processing circuit configured to perform the various functions and processes described throughout the present disclosure.

Figure 3:
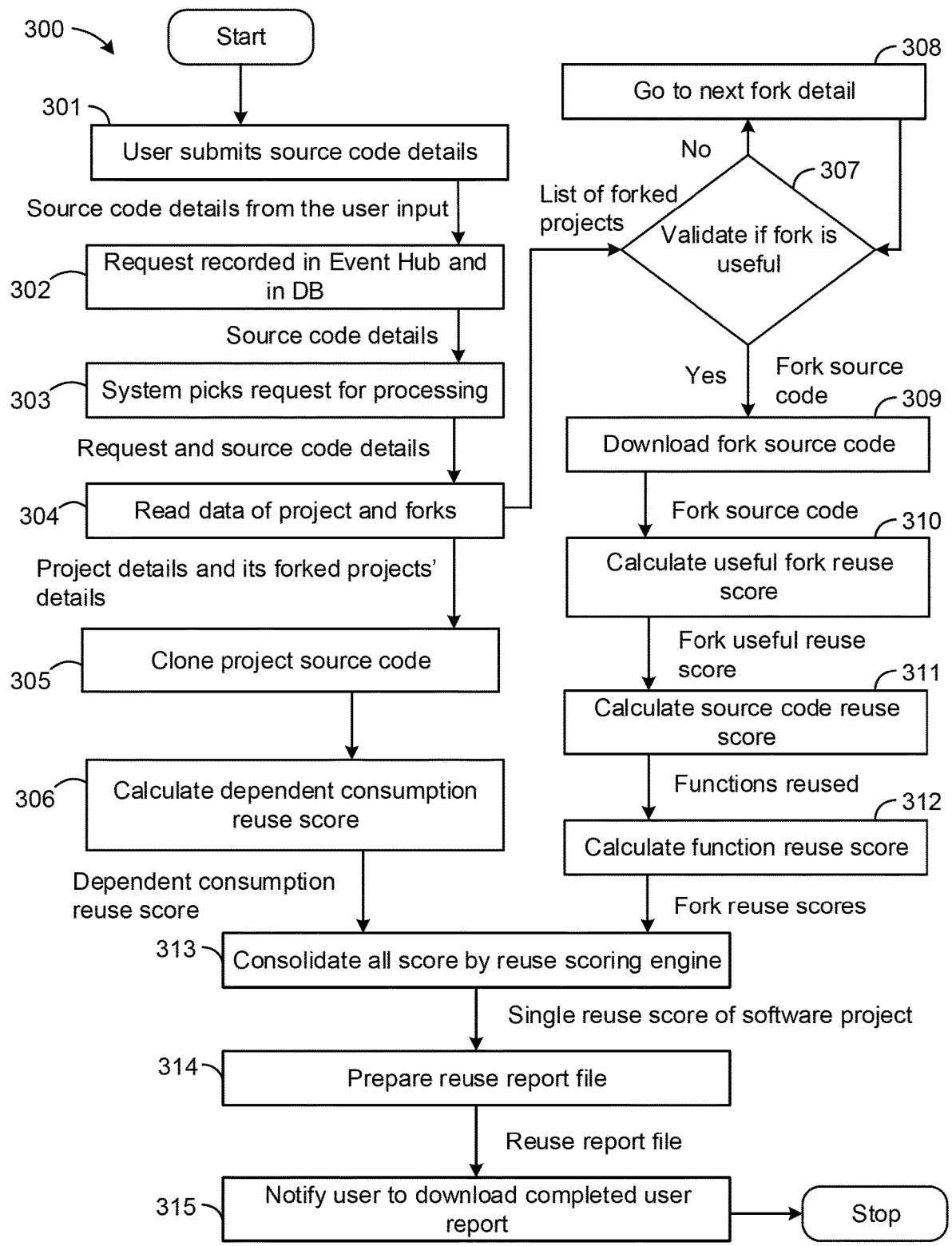
FIG. 3 shows the overall process flow for automatically calculating the reuse for software projects, according to some embodiments.

FIG. 3, shows an overall process 300 of calculating the reuse score of the software project, in accordance with some embodiments. In step 301, a user submits source code details. For example, the user accesses the Reuse Scoring Web Portal 101 and fills up the form with the software project details for which the reuse needs to be calculated. In step 302, the request is recorded in API Hub 102 and in the Database 115. For example, the request details are received by the system 100 and recorded in the Database 115 for tracking. In step 303, the system 100 picks the request for processing. For example, the system 100 starts the processing of the reuse scoring by calling the different components for different processing steps. In step 304, the system 100 reads data of project and forks. For example, the system 100 retrieves all the details of the project and its forked projects from the Source Code Repository 117 which is used in the next step 305 of cloning the project source code to download the source code of the project. In step 306, the dependent consumption reuse score is calculated. For example, the system 100 finds all the dependent projects and parses their source code to identify the different project calls to calculate the dependent consumption reuse score. In step 307, whether a fork is useful is determined based on a list of the forked projects. For example, the system 100 checks the fork project details on code activity to validate if the fork is useful or not. If the fork project is a useful fork, in step 309, the fork project's source code is downloaded. In step 310, the useful fork reuse score is calculated. In step 311, the source code reuse in the fork is calculated. In step 312, the function reuse score is calculated based on the functions reused by the fork project. In step 313, the Reuse Scoring Engine 107 consolidates all the individual scores into a single reuse score of the software project. In step 314, a report is prepared with the scoring details. In step 315, the user is notified to download completed reuse report via an email is sent to the user informing the completion of the reuse scoring process.

A representative sample of the metadata of a sample project calculated using the process 300 of FIG. 3 is shown below:

```
projectmetadata: {
    _id: 'django/django',
    forkscount: 26400,
    usefulforksCount: 1210,
    dependentsCount: 826727
}
```

Figure 4:
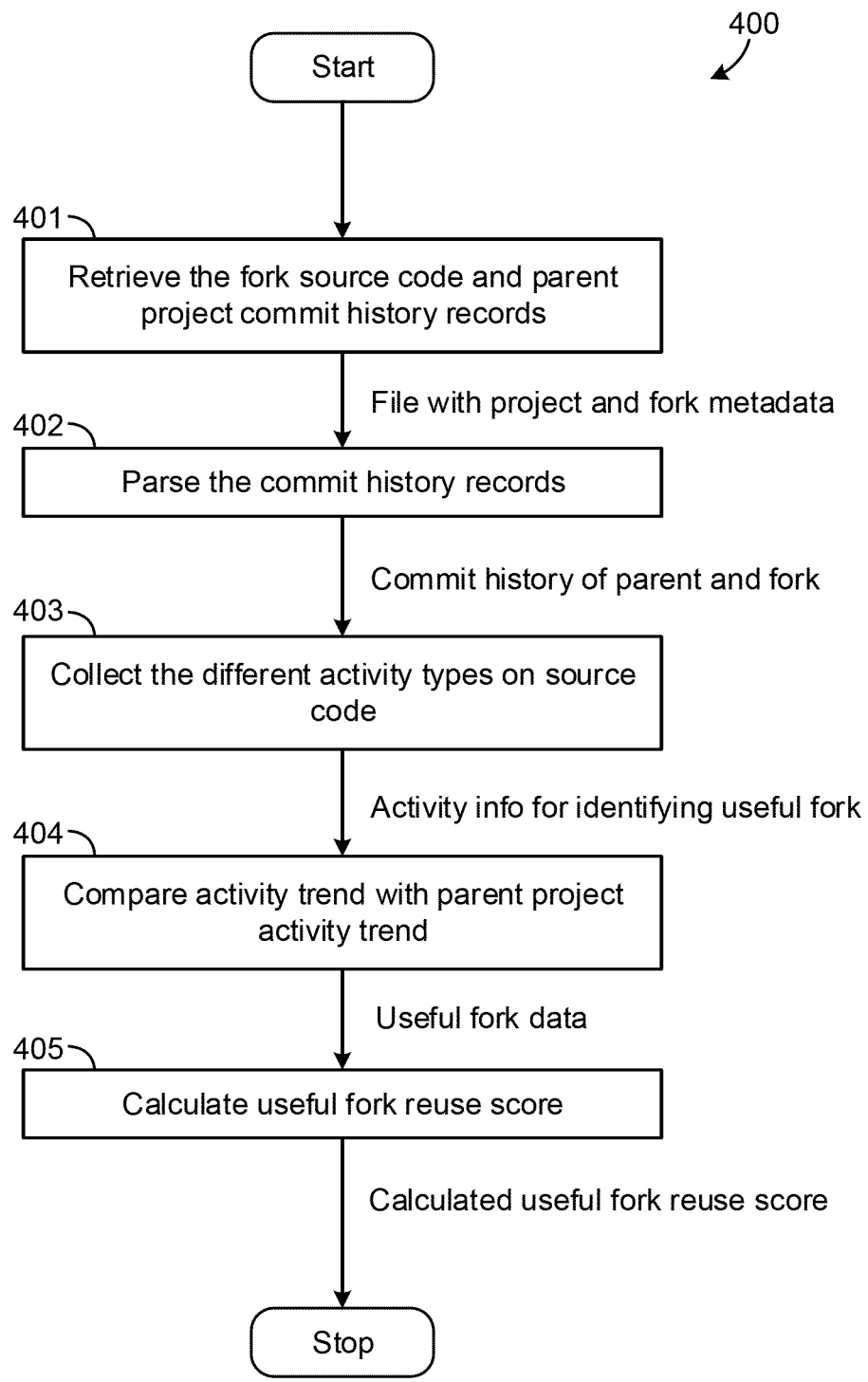
FIG. 4 shows the process of calculating the useful software project fork reuse score, according to some embodiments.

The FIG. 4 shows a process 400 for calculating the useful forks reuse score, in accordance with some embodiments. One or more components of the system 100 (e.g., the request processor 104 or the service containers 120) may include a commit history reader, a parse commit history parser, and an activity collector subsystem. In step 401, the fork source code and parent project commit history records are retrieved. For example, the open-source project's and all its forked project details are retrieved from the open-source repository, and the commit history reader component gets (or extracts or retrieves) their commit history records. These commit history records are stored in association with each forked project. In step 402, the commit history records are parsed. For example, the commit history parser extracts the required data such as the commit data and time, and number of files being committed from commit history records. These details are stored in the Database 115.

In step 403, the different activity types on source code are collected. For example, the activity collector subsystem retrieves different activities such as the commit data and time, number of files being committed from commit history records information and aggregates them in per the defined duration e.g., 24 hours to get the number of commits and files affected hourly, for example, across the parent project and all the forked projects. This calculation is done for the data from since the fork was originally created.

In step 404, activity trend and the parent project activity trend may be compared based on the aggregated data. For example, the trend of the parent project and the forked project commit activity may be compared by comparing the daily commit numbers and number of files being changed daily separately. If either of the numbers e.g., the daily commit of the forked project or number of files changed daily in the fork is more than the threshold value of the parent project set as a qualifier rule, that forked project is considered to pass as a useful fork. The threshold value rule, e.g., can be set as "70% in last 3 months". This rule will be evaluated to check for two conditions. The first condition is to check if the number of files changed in the forked project is greater than or equal to 70% of the number of files changed in parent project in the same period. The second condition is to check if the number of commits in the forked project is greater than or equal to 70% of the number of commits done in the parent project in the same period. If either of this condition is true, the fork is a useful fork. These lists of the useful forked projects commit data is sent to the Fork Reuse Index Calculator 106 to calculate the fork reuse score.

Figure 5:
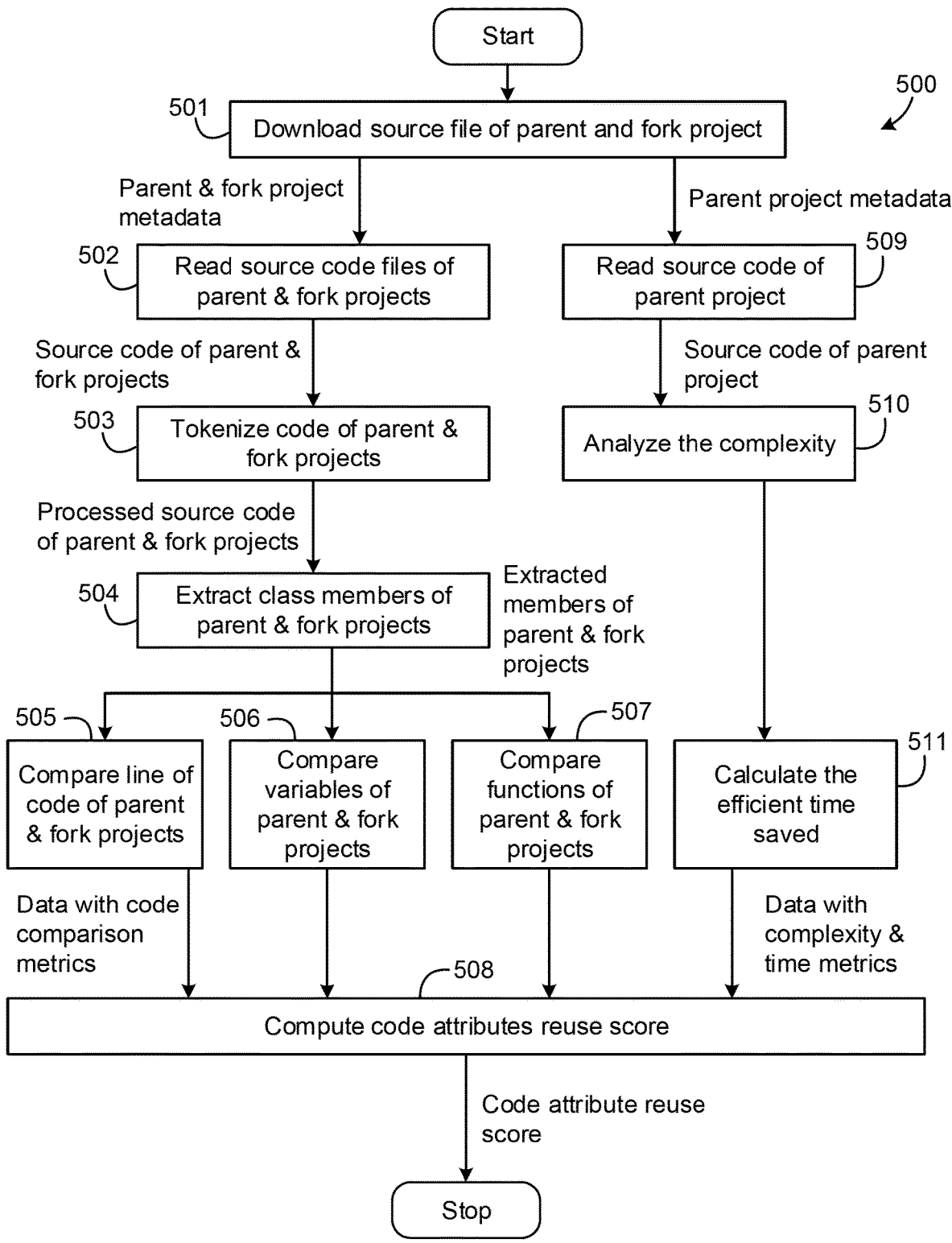
FIG. 5 shows the process of calculating the source code attributes reuse score in the useful forks, according to some embodiments.

In step 405, the useful fork reuse score is calculated. For example, the Reuse Scoring Engine 107 iterates through the list of the forked project data and processes the forked project data to create a consolidated score representing an overall useful fork reuse score for that project. One such way to calculate the trend could be Fork Reuse Score=sum (% score of files changed)/num of fork+sum (% score of commits)/num of fork FIG. 5 shows a process 500 for calculating the source code attributes reuse score, in accordance with some embodiments. One or more components of the system 100 (e.g., the request processor 104 or the service containers 120) may include a source code cloner, a source file loader, and a variable comparator. The list of the useful forks from the fork reuse score calculator is the input to the process 500. In step 501, source file of parent and fork project are downloaded. For example, the source code cloner component iterates through the list of the useful fork projects and retrieves their source code from the open-source repository and downloads it to the system file storage. In step 502, source code files are read. For example, each project code is taken up for processing. The source file loader components read all the source files of the parent project and the forked projects using a type of file reader depending on the programming language. In step 503, the system 100 receives each file content and stores the source code file contents in different structures for each of the types in programming language such as variables, functions, and statements. In step 504, the system 100 receives the loaded structures and class members are extracted. For example, the diverse types of members data such as variables, functions and statements and using appropriate comparator to compare the fork source file attributes with their parent source file attributes.

In step 505, the system 100 compares the programming lines of code between the source file of the fork and the parent and identifies the matching lines. In step 506, the variable comparator is used to compare the variables member definitions in the source file of the parent and the fork and identifies the matching variables. In step 507, the method comparator will compare the method name and signature of the fork and the parent to identify the matching methods.

In step 511, the system 100 calculates the efficient time saved for writing source codes which includes reading the source code of the parent project, analyze the complexity and the time saved in writing source codes. An example of calculating the time efficiency is provided below:

Time efficiency=Total Effort in Hours to create component*(1−re), where total effort to create the component can be computed based on different software models like COCOMO, Function Point Analysis etc. and re is the reuse effort based on the complexity of the code. The total complexity of the code can be determined based on the code metrics and its structural complexity impacting the effort to understand its usage. For example, re=0.3 when total complexity of code is greater than 1000.

In step 508, the system 100 consolidates these metrics for all the source files compared, and the Source Code Attributes Reuse Index is calculated. An example for calculating the attributes reuse score is provided below:

LoC Reuse Sub-Index=No. of lines of codes matching in both Parent and fork/Total lines of code in fork.

Variable Reuse Sub-Index=Number Of variables matching in both parent and fork/Total number of functions in fork.

Method Reuse Sub-Index=Number Of functions matching in both parent and fork/Total number of functions in fork.

Source Code Attributes Reuse Index=(LoC Reuse Sub-Index+Variable Reuse Sub-Index+Method Reuse Sub-Index)/3.

Figure 6:
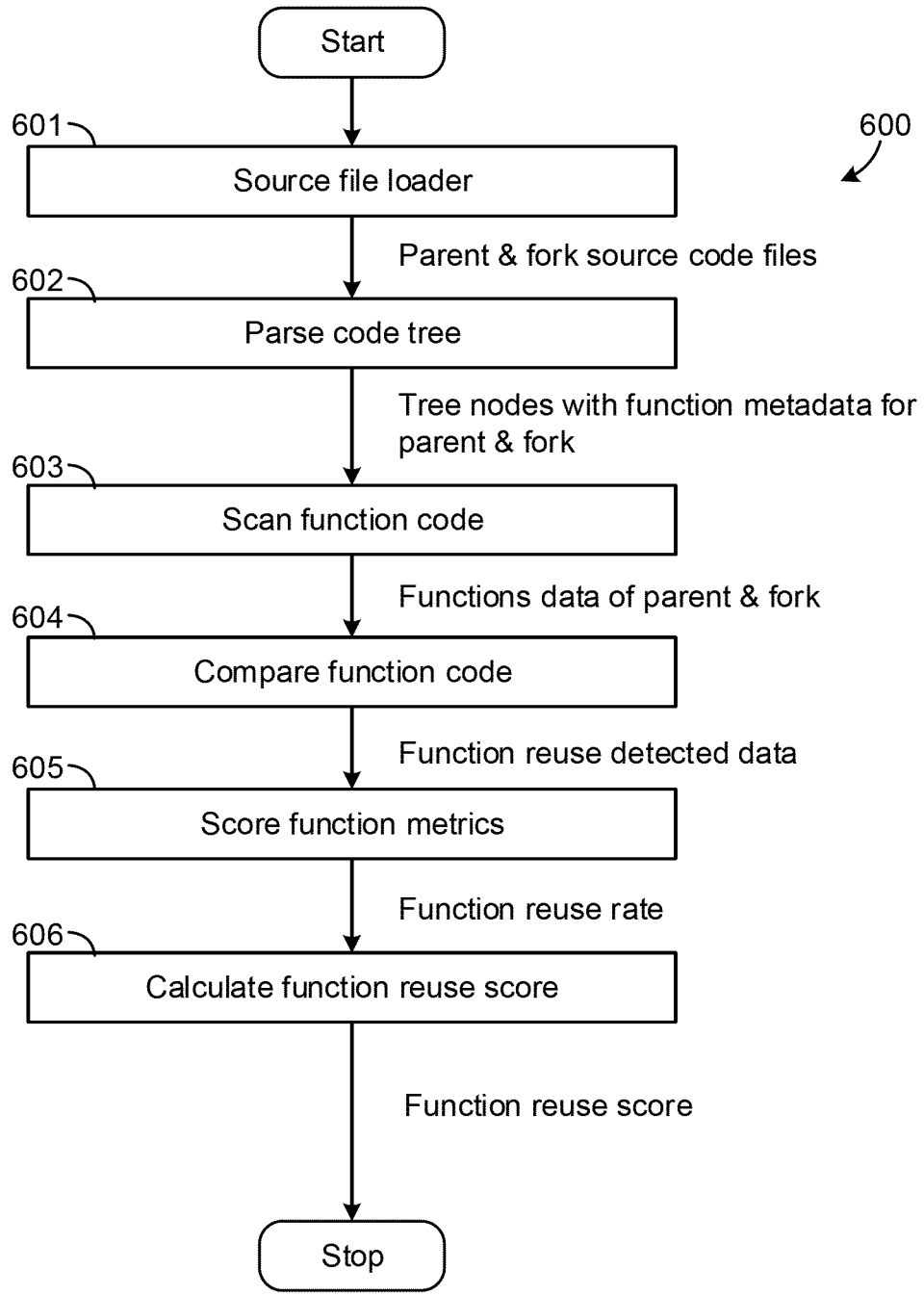
FIG. 6 shows the process of calculating the code function reuse score in the useful forks, according to some embodiments.

FIG. 6 shows a process 600 for calculating the score for the function reuse (e.g., the function reuse score) considering minor variations and enhancements done to the original functions from the parent source, in accordance with some embodiments. One or more components of the system 100 (e.g., the request processor 104 or the service containers 120) may include a tree composer, function scorer. This is an advanced way to compare the functions based on NLP techniques and logical comparisons, a representation of such might include fuzzy logic, similarity based probabilistic logic etc. In step 601, the same class or same name source file from the parent and fork project is loaded by reading the file contents using appropriate component for the program language of the source file. In step 602, the loaded file content is taken by the tree composer and it creates a tree node structure which can be traversed with a parent node to child node relationship. Each node is uniquely identified along with its type. In step 603, the Function Scanner Service 111 component traverses this node structure to identify functions from the forked class and it compares with each of the functions in the parent project's class. In step 604, the function codes are compared to provide flexibility to identify and match the changes done to the function name or the function contents. The function level name changes e.g., can be like adding a prefix or suffix, similar meaning names, similar sounding names. Similarly, it can detect these types of minor changes in the variable names used within the function. Hence with this component, the system 100 will detect these changes and rest of the API operations being the same, the system 100 will mark these functions as the same function from the parent project e.g., a function reuse has been identified. In step 605, the reused function data is provided to a function scorer, and the function scorer calculates the function reuse rate with number of matching function members between the forked function and the parent function. In step 606, the reuse rate of the functions is provided to the function scorer which consolidates all the functions score per class and aggregates it at the project level to give the final function Reuse Index. An example of calculating the score could be function Reuse rate of function=number of function lines in fork/number of function lines in parent and function Reuse Index=Sum of Reuse rate of function/Total number functions in fork.

Figure 7:
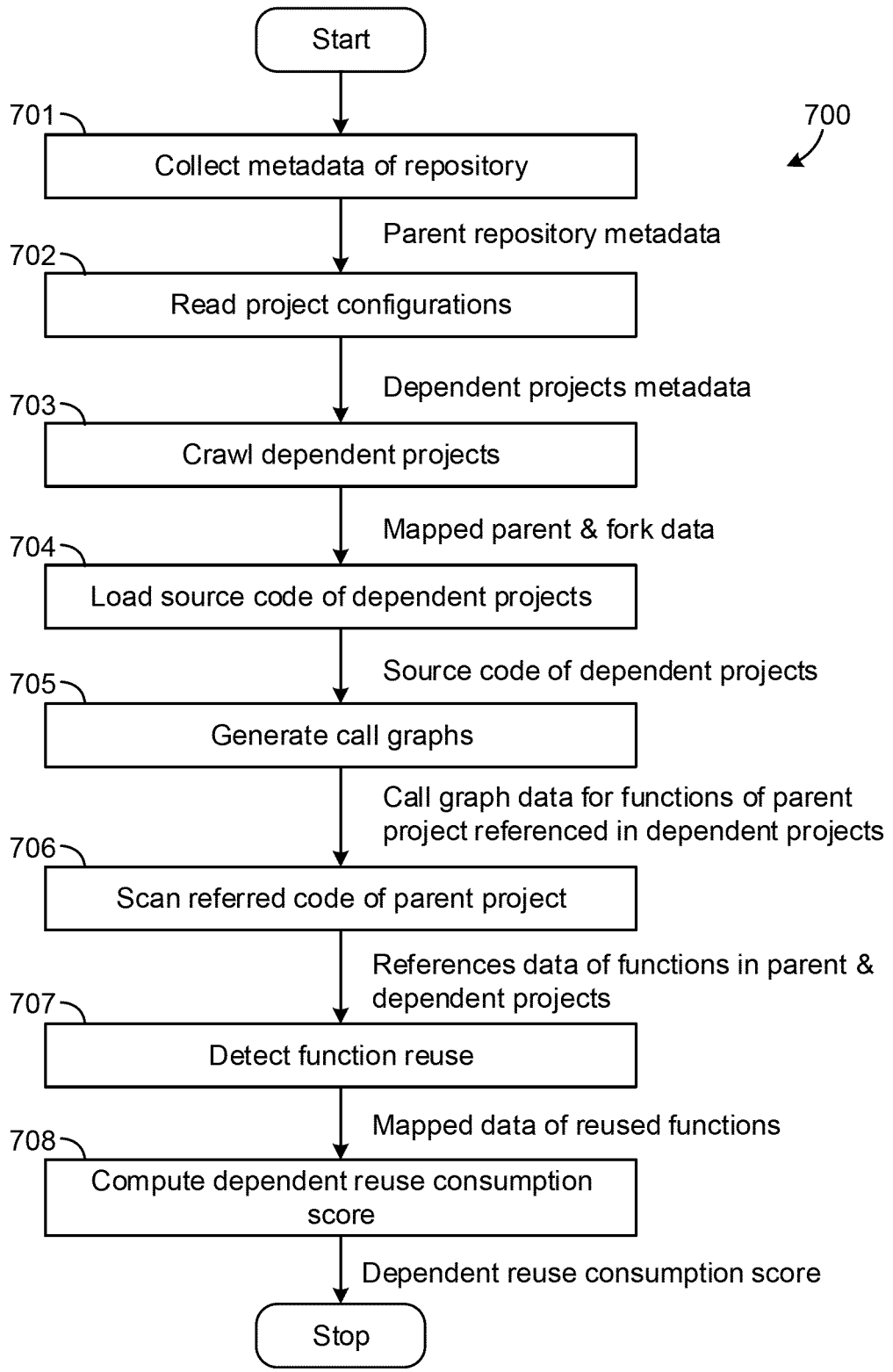
FIG. 7 shows the process of calculating the software project dependent consumption reuse score, according to some embodiments.

FIG. 7 shows a process 700 for calculating the dependent consumption reuse score based on the parent functions used by the dependent libraries, in accordance with some embodiments. In step 701, the metadata collector reads, from the repository, all the project related key information like location of the build file. There are different build files depending on the programming language and the type of build process e.g., for Java language projects, the build file will be a maven pom file. For other languages, the build files are of different formats which may be processed accordingly. The location of the build file is retrieved. In step 702, project configurations are read from the metadata, and the reader parses the build file and traces the dependencies for that library. This process is done for all the projects in the open-source repository. The parsed data having a list of projects and the dependencies built from the build files is provided. In step 703, the crawler component takes (or crawls) this tree list of project and dependencies information and creates a reverse tree map with details of the parent project and the projects which are dependent on it. This way, the list of projects which are using a particular open-source project in the repository is easily identifiable. In step 704, source code of dependent projects are loaded, and the source code loader module helps in loading the source files of the child projects. In step 705, call graphs are generated, and a graph of all functions being called from the source file functions with the referenced libraries is generated. In step 706, the reference scanner scans code referred to in the parent project and is used in building a method call and class references tree map in each class or the source file. In step 707, this tree map is used to detect function reuse to find the references of any component of the parent project and identify the functions of the parent component being used by the dependent class. In step 708, this list of the identified functions is used to compute dependent reuse consumption score, where the score computation engine calculates the score for dependent consumption reuse score. An embodiment of calculation for Dependent Consumption reuse score can be as shown below:

Dependent consumption reuse score=Number of functions re-used by dependent/Number of external functions on the parent components.

Figure 8:
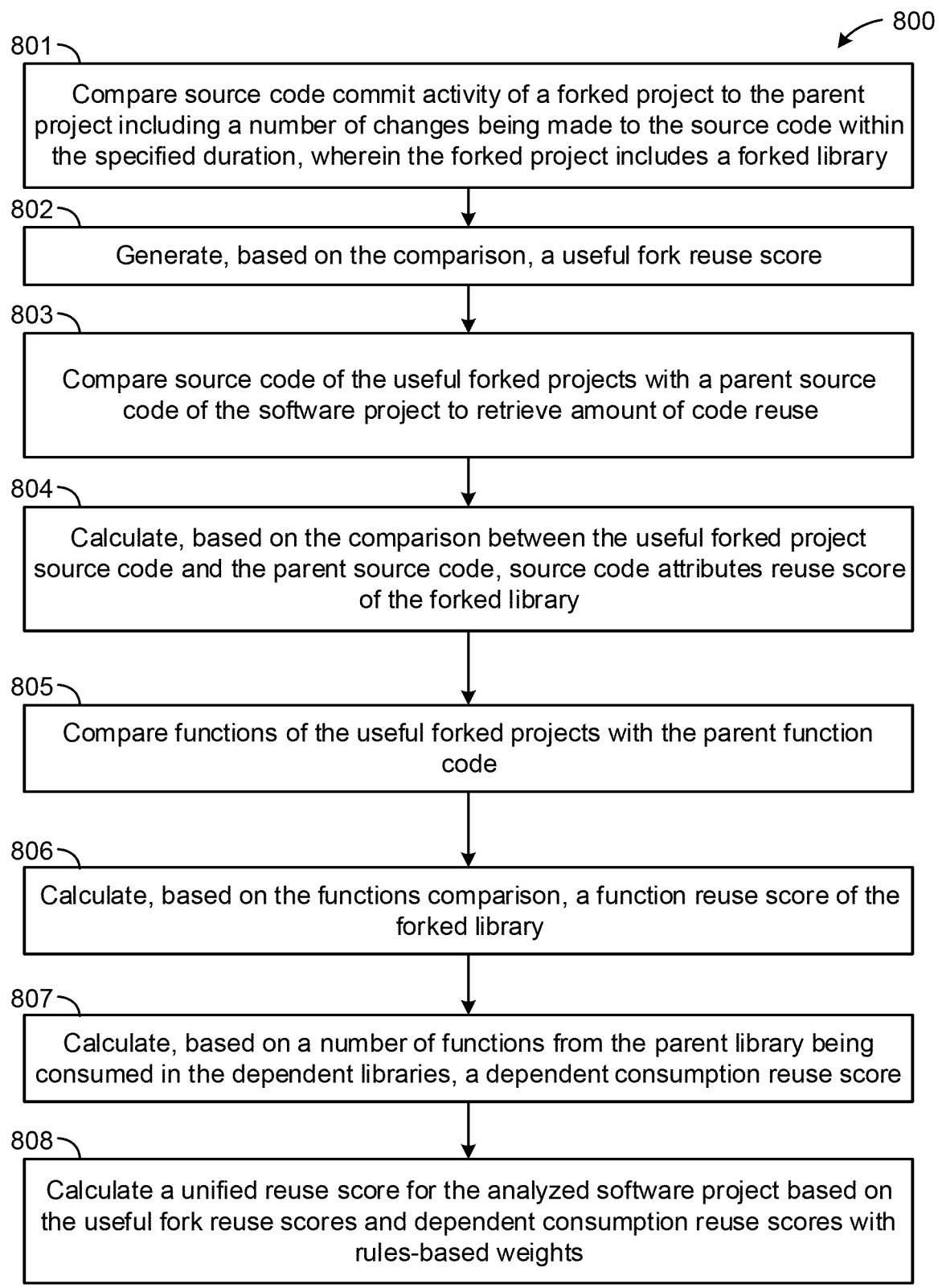
FIG. 8 shows a process that can be performed by a computer program product for automatically scoring open-source libraries on the state of reuse in a software project, according to some embodiments.

FIG. 8 shows a process 800 that can be performed by a computer program product for automatically scoring open-source libraries on the state of reuse in a software project, according to some embodiments. Process 800 can be performed by one or more components of system 100 as previously described. The computer program includes a processor and memory storing instructions thereon. The instructions when executed by the processor causes the processor to perform multiple steps. The processor compares source code commit activity of a forked project to the parent project including a number of changes being made to the source code within the specified duration, wherein the forked project includes a forked library (step 801). The processor generates, based on the comparison, a useful fork reuse score (step 802), and comparing source code of the useful forked projects with a parent source code of the software project to retrieve amount of code reuse (step 803). The processor calculates, based on the comparison between the useful forked project source code and the parent source code, source code attributes reuse score of the forked library (step 804). The processor compares functions of the useful forked projects with the parent function code (step 805), calculates, based on the functions comparison, a function reuse score of the forked library (step 806), and calculates, based on a number of functions from the parent library being consumed in the dependent libraries, a dependent consumption reuse score (step 807). The processor calculates a unified reuse score for the analyzed software project based on the useful fork reuse scores and dependent consumption reuse scores with rules-based weights.

The methods disclosed in this disclosure comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Certain aspects of this disclosure may comprise a computer program product for performing the operations presented herein. For example, such a computer program product may comprise a computer readable medium having instructions stored thereon, the instructions being executable by one or more processors to perform the operations described herein. For certain aspects, the computer program product may include packaging material.

As multiple embodiments of the present disclosure have been elaborated above, it should be construed that they have been described by way of example alone, and not by way of limitation. Hence, the scope of the present disclosure should not be limited by any of the exemplary embodiments. Additionally, the disclosure is defined above in terms of multiple exemplary embodiments and applications. It should be understood that the several features and the functionality explained in one or more of the distinct embodiments are not limited in their applicability to the specific embodiment with which they are explained, but instead can be functional, by itself or in a defined combination, to one or more of the other embodiments of the disclosure, whether or not such embodiments are explained and whether or not such aspects are presented as being a part of a described embodiment.

What is claimed is:

1. A system for automatically scoring open-source libraries on a state of reuse in a software project, the system comprising:
   one or more processors and memory storing instructions that, when executed by the one or more processors, cause the one or more processors to perform operations comprising:
     extracting information about the software project from a source code repository;
     determining whether the extracted information includes information regarding any forked projects;
     calculating, upon determining that a forked project is included, a useful fork reuse score for the forked project based on source code attributes including a source code class;
     creating a tree structure for the source code class;
     identifying functions from the tree structure of the source code class;
     identifying similar code sections from the two source code files;
     calculating a code attributes reuse score based on the similar code sections;
     calculating a dependent consumption reuse score which indicates how much a function is reused by a dependent class; and
     calculating a unified reuse score based on the useful fork reuse score of the forked project and the dependent consumption reuse score for the analyzed project;
   wherein calculating the useful fork reuse score comprises:
     collecting data of commit history records associated with source code of forked open-source projects;
     retrieving each commit history record with the date and timestamp, and the number of files affected by each commit in the commit history record;
     determining a number of commits performed during a defined interval to generate a source code commit activity score, wherein whether the fork is active or not is dependent on the source code commit activity score;
     selecting useful forks by verifying whether regular commits are happening to a forked repository and ignoring other forks based on one of: no activity and activity being less than a threshold limit;
     validating the forked project for its usefulness based on commit history trends of the forked project and a parent project;
     comparing respective source code commit history rates of the parent project and the forked project to generate a weighted score based on increased or decreased rate of the commits;
     combining the respective source code commit history rates of the parent project and the forked project to generate a final score for the forked projects by further comparing their scores against a set threshold baseline score; and
     determining, via the scores, the useful fork reuse score of the forked project.

2. The system of claim 1, the operations further comprising, via a web portal, a web form for accepting project details including one or more of user name, repository details, remote location URL of the project, or user email details for sending notifications.

3. The system of claim 1, the operations further comprising reading the key project information from the source code repositories including one or more of programming language of the project, location of the build file, latest release version of the project, commit histories, or forks details.

4. The system of claim 1, the operations further comprising:
   fetching source code commit history of the project and its forks; and
   calculating the useful fork reuse score.

5. The system of claim 1, wherein the calculating the unified score includes applying different weights to the individual scores based on rules on how to apply the weights.

6. The system of claim 1, the operations further comprising:
   connecting to the source code repository; and
   downloading the source code for the software project and the forked project; and
   saving the source code for both the software project and the forked project to the file storage.

7. The system of claim 1, the operations further comprising:
   finding, using natural language processing techniques and logical comparisons, similarity of functions between the software project and the forked project in the code based on function names and variable names used in the functions; and
   detecting variations in the function names or the variable names including one or more of a prefix, a suffix, similar sounding names, changes in similar operations in the code, or order of lines in functions apart from other variations.

8. The system of claim 7, the operations further comprising:
   tokenizing a plurality of lines of code from the software project and the forked project;
   comparing the tokens of the plurality of lines of code;
   calculating efficient time saved by reusing the parent source code; and
   comparing the lines of code, variables, and functions of the software project and the forked project when calculating the code attribute reuse score.

9. The system of claim 1, the operations further comprising:

scanning a generated tree structure for the source code file; and
identifying the functions and signatures of the source code file in the tree.

10. The system of claim 1, the operations further comprising:
reading the source files using a programming language specific parser; and
finding the matching lines of code between the source file in software project and the forked project.

11. The system of claim 1, the operations further comprising:
scanning the entire source repository; and
creating the data structure with details of the software project and the projects dependent on the software project.

12. A method for automatically scoring open-source libraries on a state of reuse in a software project, the method comprising:
comparing source code commit activity of a forked project to the parent project including a number of changes being made to the source code within the specified duration, wherein the forked project includes a forked library;
generating, based on the comparison, a useful fork reuse score;
comparing source code of the useful forked projects with a parent source code of the software project to retrieve amount of code reuse;
calculating, based on the comparison between the useful forked project source code and the parent source code, source code attributes reuse score of the forked library;
comparing functions of the useful forked projects with the parent function code;
calculating, based on the functions comparison, a function reuse score of the forked library;
calculating, based on a number of functions from the parent library being consumed in the dependent libraries, a dependent consumption reuse score; and
calculating a unified reuse score for the analyzed software project based on the useful fork reuse score and dependent consumption reuse score with rules-based weights;
wherein calculating the useful fork reuse score comprises:
collecting data of commit history records associated with source code of forked open-source projects;
retrieving each commit history record with the date and timestamp, and the number of files affected by each commit in the commit history record;
determining a number of commits performed during a defined interval to generate a source code commit activity score, wherein whether the fork is active or not is dependent on the source code commit activity score;
selecting useful forks by verifying whether regular commits are happening to a forked repository and ignoring other forks based on one of: no activity and activity being less than a threshold limit;
validating the forked project for its usefulness based on commit history trends of the forked project and a parent project;
comparing respective source code commit history rates of the parent project and the forked project to generate a weighted score based on increased or decreased rate of the commits;
combining the respective source code commit history rates of the parent project and the forked project to generate a final score for the forked projects by further comparing their scores against a set threshold baseline score; and
determining, via the scores, the useful fork reuse score of the forked project.

13. The method of claim 12, wherein calculating the unified reuse score comprises:
fetching rules for different weights for the individual reuse scores from reuse and dependent scores; and
scaling the individual scores to a pre-defined scale.

14. A method for automatically scoring open-source libraries on a state of reuse in a software project, the method comprising:
comparing source code commit activity of a forked project to the parent project including a number of changes being made to the source code within the specified duration, wherein the forked project includes a forked library;
generating, based on the comparison, a useful fork reuse score;
comparing source code of the useful forked projects with a parent source code of the software project to retrieve amount of code reuse;
calculating, based on the comparison between the useful forked project source code and the parent source code, source code attributes reuse score of the forked library;
comparing functions of the useful forked projects with the parent function code;
calculating, based on the functions comparison, a function reuse score of the forked library;
calculating, based on a number of functions from the parent library being consumed in the dependent libraries, a dependent consumption reuse score; and
calculating a unified reuse score for the analyzed software project based on the useful fork reuse score and dependent consumption reuse score with rules-based weights;
wherein calculating the source code attributes reuse score comprises:
retrieving the source code of useful fork projects;
using programming language specific tokenizers to tokenize the source code constructs include one or more of variables, functions, or statements;
extracting class members with details on the types of members data including one or more of variables, functions, or statements;
comparing the fork source file attributes with their parent source file attributes;
comparing the programming lines of code between the source file of the fork and the parent;
comparing variables member definitions in the source file of the parent and the fork; and
computing the code attributes reuse score by consolidating one or more of the details on the types of members data, the source file attributes, the programming lines of code, or the variable member definitions.

15. A method for automatically scoring open-source libraries on a state of reuse in a software project, the method comprising:
comparing source code commit activity of a forked project to the parent project including a number of changes being made to the source code within the specified duration, wherein the forked project includes a forked library;
generating, based on the comparison, a useful fork reuse score;

comparing source code of the useful forked projects with a parent source code of the software project to retrieve amount of code reuse;

calculating, based on the comparison between the useful forked project source code and the parent source code, source code attributes reuse score of the forked library;

comparing functions of the useful forked projects with the parent function code;

calculating, based on the functions comparison, a function reuse score of the forked library;

calculating, based on a number of functions from the parent library being consumed in the dependent libraries, a dependent consumption reuse score; and calculating a unified reuse score for the analyzed software project based on the useful fork reuse score and dependent consumption reuse score with rules-based weights;

wherein calculating the function reuse score comprises:
    loading the same class or same name source file from the parent and fork project;
    creating a tree node structure;
    identifying functions from the forked class, by traversing the tree node structure;
    comparing the identified functions with each of the functions in the parent project's class;
    calculating a function reuse rate with number of matching function members between the forked function and the parent function;
    consolidating all the functions score per class; and
    calculating, at the project level, to the final function reuse score based on the consolidated functions scores.

16. A method for automatically scoring open-source libraries on a state of reuse in a software project, the method comprising:
    comparing source code commit activity of a forked project to the parent project including a number of changes being made to the source code within the specified duration, wherein the forked project includes a forked library;
    generating, based on the comparison, a useful fork reuse score;
    comparing source code of the useful forked projects with a parent source code of the software project to retrieve amount of code reuse;
    calculating, based on the comparison between the useful forked project source code and the parent source code, source code attributes reuse score of the forked library;
    comparing functions of the useful forked projects with the parent function code;
    calculating, based on the functions comparison, a function reuse score of the forked library;
    calculating, based on a number of functions from the parent library being consumed in the dependent libraries, a dependent consumption reuse score; and
    calculating a unified reuse score for the analyzed software project based on the useful fork reuse score and dependent consumption reuse score with rules-based weights;
    wherein calculating the dependent consumption reuse score comprises:
        collecting metadata of repository including project related key information including location of a build file;
        parsing the build file;
        tracing dependencies for the project;
        building a tree list of projects and the dependencies;
        creating, based on the tree list of project and dependencies information, a reverse tree map with details of the parent project and the projects which are dependent on the project;
        loading source code of dependent projects;
        generating a call graph of all referenced functions being called from the dependent source file;
        identifying the references of components of the parent project;
        identifying the functions of the parent component being used by the dependent class; and
        computing the dependent consumption reuse score based on the list of the identified functions reused.

17. A computer program product for automatically scoring open-source libraries on a state of reuse in a software project, the computer program product comprising a processor and a non-transitory machine-readable storage medium storing instructions thereon, wherein the instructions when executed by the processor cause the processor to perform operations comprising:
    comparing source code commit activity of a forked project to the parent project including a number of changes being made to the source code within the specified duration, wherein the forked project includes a forked library;
    generating, based on the comparison, a useful fork reuse score;
    comparing source code of the useful forked projects with a parent source code of the software project to retrieve amount of code reuse;
    calculating, based on the comparison between the useful forked project source code and the parent source code, source code attributes reuse score of the forked library;
    comparing functions of the useful forked projects with the parent function code;
    calculating, based on the functions comparison, a function reuse score of the forked library;
    calculating, based on a number of functions from the parent library being consumed in the dependent libraries, a dependent consumption reuse score; and
    calculating a unified reuse score for the analyzed software project based on the useful fork reuse score and dependent consumption reuse score with rules-based weights;
    wherein calculating the useful fork reuse score comprises:
        collecting data of commit history records associated with source code of forked open-source projects;
        retrieving each commit history record with the date and timestamp, and the number of files affected by each commit in the commit history record;
        determining a number of commits performed during a defined interval to generate a source code commit activity score, wherein whether the fork is active or not is dependent on the source code commit activity score;
        selecting useful forks by verifying whether regular commits are happening to a forked repository and ignoring other forks based on one of: no activity and activity being less than a threshold limit;
        comparing respective source code commit history rates of a parent project and the forked project to generate a weighted score based on increased or decreased rate of the commits;
        combining the respective source code commit history rates of a parent project and the forked project to generate a final score for the forked projects by further comparing their scores against a set threshold baseline score; and determining, via the scores, the useful fork reuse score of the forked project.

18. A computer program product for automatically scoring open-source libraries on a state of reuse in a software project, the computer program product comprising a processor and a non-transitory machine-readable storage medium storing instructions thereon, wherein the instructions when executed by the processor cause the processor to perform operations comprising:

comparing source code commit activity of a forked project to the parent project including a number of changes being made to the source code within the specified duration, wherein the forked project includes a forked library;

generating, based on the comparison, a useful fork reuse score;

comparing source code of the useful forked projects with a parent source code of the software project to retrieve amount of code reuse;

calculating, based on the comparison between the useful forked project source code and the parent source code, source code attributes reuse score of the forked library;

comparing functions of the useful forked projects with the parent function code;

calculating, based on the functions comparison, a function reuse score of the forked library;

calculating, based on a number of functions from the parent library being consumed in the dependent libraries, a dependent consumption reuse score; and calculating a unified reuse score for the analyzed software project based on the useful fork reuse score and dependent consumption reuse score with rules-based weights;

wherein calculating the source code attributes reuse score comprises:

retrieving the source code of useful fork projects;

using programming language specific tokenizers to tokenize the source code constructs include one or more of variables, functions, or statements;

extracting class members with details on the types of members data including one or more of variables, functions, or statements;

comparing the fork source file attributes with their parent source file attributes;

comparing the programming lines of code between the source file of the fork and the parent;

comparing variables member definitions in the source file of the parent and the fork; and computing the code attributes reuse score by consolidating one or more of the details on the types of members data, the source file attributes, the programming lines of code, or the variable member definitions.

* * * * *